(12) United States Patent
Bly, Jr. et al.

(10) Patent No.: US 8,715,498 B2
(45) Date of Patent: May 6, 2014

(54) SYSTEM AND APPARATUS FOR TREATING WELL FLOW-BACK AND PRODUCED WATER OR OTHER WASTEWATER

(75) Inventors: Joseph M. Bly, Jr., White Oak, TX (US); Melvin O. Stacy, Baton Rouge, LA (US); Enrique M. Proaño, Cypress, TX (US)

(73) Assignee: Tervita Corporation, Calgary, CA (US)

( * ) Notice: Subject to any disclaimer, the term of this patent is extended or adjusted under 35 U.S.C. 154(b) by 374 days.

(21) Appl. No.: 13/024,109

(22) Filed: Feb. 9, 2011

(65) Prior Publication Data
US 2012/0199524 A1  Aug. 9, 2012

(51) Int. Cl.
    *C02F 3/12* (2006.01)
    *B01D 35/00* (2006.01)
    *B01D 29/00* (2006.01)

(52) U.S. Cl.
    USPC .......... 210/194; 210/205; 210/206; 210/207; 210/241; 210/259; 210/261; 210/512.3

(58) Field of Classification Search
    None
    See application file for complete search history.

(56) References Cited

U.S. PATENT DOCUMENTS

| | | |
|---|---|---|
| 3,933,642 A | 1/1976 | Wilson |
| 3,941,695 A | 3/1976 | Harris |
| 3,997,436 A | 12/1976 | Stoev et al. |
| 4,022,691 A | 5/1977 | Heinrich |
| 4,054,514 A | 10/1977 | Oltmann |
| 4,151,075 A | 4/1979 | Othmer |
| 4,151,083 A | 4/1979 | Dove |
| 4,179,368 A | 12/1979 | Willis |
| 4,192,752 A | 3/1980 | de Mello Ribeiro Pinto |
| 4,274,958 A | 6/1981 | Fitch |
| 4,367,145 A | 1/1983 | Simpson et al. |
| 4,405,456 A | 9/1983 | Kinzer et al. |
| 4,436,632 A | 3/1984 | Beard |
| 4,446,018 A | 5/1984 | Cerwick |
| 4,470,903 A | 9/1984 | van Leeuwen |
| 4,490,260 A | 12/1984 | Moore |
| 4,498,986 A | 2/1985 | Temme et al. |

(Continued)

OTHER PUBLICATIONS

Mixing of Fluids [http://www.uobabylon.edu.iq-uobColeges-ad_downloads-5_4863_857.pdf; 1988 & 1995; 18 pages].*

(Continued)

*Primary Examiner* — Dirk Bass
*Assistant Examiner* — Hayden Brewster
(74) *Attorney, Agent, or Firm* — Gary L. Bush; Andrews Kurth LLP (57) ABSTRACT

A polymer-free method and self-draining self-cleaning apparatus for treatment of water with high total dissolved solids including optional pretreatment, precipitation/flocculation, and separation. The pH is raised by addition of caustic soda and/or soda ash. In a vertical clarifier silo, the feed is gently mixed to cause dissolved solids to precipitate and agglomerate to form suspended flocculates. The clarifier includes an internal mixer surrounded by a cylindrical tube diffuser. Rotation of the mixer provides gentle dual circulation patterns within the clarifier that allow for flocculates of a predetermined size to settle from suspension. The clarifier may also include one or more vertical recirculation lines to recirculate some of the heavier flocculates at the bottom of the vessel into the mixer chamber to enhance precipitation via the seeding effect. The suspended flocculates are stripped from the feed water in a centrifugal separator. The clarifier silo may be trailer mounted for rapid deployment.

18 Claims, 9 Drawing Sheets

(56) References Cited

U.S. PATENT DOCUMENTS

| | | |
|---|---|---|
| 4,515,697 A | 5/1985 | Elmaleh et al. |
| 4,569,756 A | 2/1986 | Klein |
| 4,585,063 A | 4/1986 | Venardos et al. |
| 4,603,000 A | 7/1986 | Casey |
| 4,747,196 A | 5/1988 | Moir |
| 4,775,468 A | 10/1988 | Peterson |
| 4,784,764 A | 11/1988 | Kleinschnittger et al. |
| 4,865,734 A | 9/1989 | Schulz |
| 4,871,459 A | 10/1989 | Titoff |
| 4,885,079 A | 12/1989 | Eppig et al. |
| 4,957,633 A | 9/1990 | Suutarinen |
| 4,963,257 A | 10/1990 | Schulz |
| 4,976,871 A | 12/1990 | Banks et al. |
| 5,130,358 A | 7/1992 | Danner |
| 5,268,108 A | 12/1993 | Gallup et al. |
| 5,269,940 A | 12/1993 | Kawamura et al. |
| 5,302,532 A | 4/1994 | Lau |
| 5,376,280 A | 12/1994 | Wilhelm et al. |
| 5,518,617 A | 5/1996 | Timmons |
| 5,569,381 A | 10/1996 | Kuntz |
| 5,938,936 A | 8/1999 | Hodges et al. |
| 5,965,021 A | 10/1999 | Hesse et al. |
| 6,197,190 B1 | 3/2001 | Hanlon |
| 6,217,761 B1 | 4/2001 | Catanzaro et al. |
| 6,276,537 B1 | 8/2001 | Esler et al. |
| 6,406,624 B1 | 6/2002 | DeVos |
| 6,517,714 B2 | 2/2003 | Streat |
| 6,536,523 B1 | 3/2003 | Kresnyak et al. |
| 6,602,413 B2 | 8/2003 | Jorgensen et al. |
| 6,669,843 B2 | 12/2003 | Arnaud |
| 6,689,277 B2 | 2/2004 | Streat |
| 6,736,275 B2 | 5/2004 | Schneider et al. |
| 6,875,351 B2 | 4/2005 | Arnaud |
| 7,077,201 B2 | 7/2006 | Heins |
| 7,153,431 B2 | 12/2006 | Daugherty |
| 7,232,524 B2 | 6/2007 | Arnaud et al. |
| 7,258,788 B2 | 8/2007 | Pollock |
| 7,291,267 B2 | 11/2007 | Johnson et al. |
| 7,520,993 B1 | 4/2009 | Laraway et al. |
| 7,537,696 B2 | 5/2009 | Arnaud |
| 7,563,366 B2 | 7/2009 | Sun |
| 7,597,805 B2 | 10/2009 | Danielsson et al. |
| 7,638,062 B2 | 12/2009 | Movafaghian et al. |
| 7,681,643 B2 | 3/2010 | Heins |
| 7,717,275 B2 | 5/2010 | Gerges |
| 7,820,056 B2 | 10/2010 | Ochiai |
| 2005/0279716 A1 | 12/2005 | Jackman |
| 2008/0041778 A1* | 2/2008 | Clark et al. ............ 210/232 |
| 2008/0118946 A1* | 5/2008 | Fabiyi et al. ............ 435/41 |
| 2010/0125044 A1 | 5/2010 | Keister |

OTHER PUBLICATIONS

Lenntech—Centrifugation and Centrifuges [Sep. 24, 2009; 3 pages]. See pp. 2-3 regarding hydrocyclones.*

Kan et al.—Time requirement for rapid-mixing in coagulation [2002; pp. 1-9]. See Abstact and Introduction etc.*

Halliburton: "Water for Oilfield Services: Management, Treatment and Conservation"—Solving challenges.

Nozaic, D.J. and Freese, D.J.—Polyelectrolytes or Inorganics for Coagulation? Proceedings of the 2004 Water Inst. of So. Africa (WISA) Biennial Conference, Document Transformation Technologies, pp. 1503-1506, Cape Town, South Africa (May 2-6, 2004).

Robinson, David—Oil and Gas: Water treatment in oil and gas production—does it matter? Filtration + Separation (Feb. 24, 2010) http://www.filtsep.com/view/7598/oil-and-gas-water-treatment-m-oil-and-gas.

Hayward Gordon Ltd.—Oil & Gas Industry—Produced Water chemical Treatment 101, Canada, pp. 1-6 www.haywardgordon.com.

* cited by examiner

SYSTEM AND APPARATUS FOR TREATING WELL FLOW-BACK AND PRODUCED WATER OR OTHER WASTEWATER

BACKGROUND OF THE INVENTION

1. Field of the Invention

This invention relates generally to the treatment of water, and in particular to treatment of water with high total dissolved solids, such as water used in conjunction with oilfield services. For example, the invention relates to treating oily flow-back or produced water from an oil and gas well prior to disposal or for reuse as injection or fracture flow-back water.

2. Background Art

Fracture flow-back water and water produced from a well may contain hydrocarbons, solids, bacteria, and heavy metals. Produced water is generated in the process of lifting oil and gas from subterranean formations that also include water. Water accompanies oil and gas as it is lifted to the surface. Reinjection of this produced water improves the recoverable reserves from a reservoir by establishing an external water drive and by maintaining reservoir pressure. Produced water may also be reused to fracture formations.

Produced or flow-back water must be cleaned for reuse or for disposal. Often, it is preferable to treat such water at the well site to reduce the costs of handling and transporting large volumes of water to a remote treatment site. The treatment of wastewater may involve many processes, depending on the characteristics and quality of the influent feed water and requirements for the effluent treated water.

One common wastewater treatment process is the removal of various dissolved metals, heavy metals, minerals, or other compounds that are present in the water in ionic form. Water softening, the removal of principally calcium and magnesium ions, is one common application. A well-known removal process is ion exchange, in which the water is passed through a resin bed, and certain ions in solution are preferentially sorbed by and replaced with ions from the resin. Another such removal process is lime-soda softening, in which slaked lime and soda ash are added to the water. These reagents react with various metallic ions in solution to form metallic hydroxides and carbonates. These reagents also raise the pH of the water, which advantageously corresponds to a range of low solubility for the metallic hydroxides and carbonates. As a result, the addition of slaked lime and soda ash causes the precipitation of the metals from solution. Moreover, the precipitate act as coagulants, thus enmeshing suspended particles for easier removal, as described below.

Another, almost universal, wastewater treatment process is clarification, in which stable colloidal solids that will not effectively settle by the force of gravity and slow-settling suspended solids are removed from the water. In most common systems, clarification is a three-step process. The first step, coagulation, is the addition and rapid intense mixing of a coagulant that destabilizes the suspended solids to create micro-particles. The complex chemistry of coagulation and charge destabilization need not be described in detail here. Common coagulants include aluminum sulfate, ferrous sulfate, ferric sulfate, ferric chloride, lime, soda ash, and polyelectrolytes. The next step, flocculation, is the slow stirring or gentle agitation of the water to aggregate the micro-particles into larger, rapid-settling flocs. The final step is separation of the flocs from the water. Sedimentation is a commonly used process in which flocs settle to the bottom under the force of gravity. Centrifugation may also be used for separation, but is not commonly used for high-flow wastewater treatment systems.

To date, wastewater treatment systems have generally evolved in the context of municipal sewage treatment and industrial wastewater treatment. The oilfield industry has substantially adopted these conventional treatment systems, which until recently, proved adequate for oilfield use.

Conventional wastewater treatment facilities, such as used for municipal sewer and water systems and the like, commonly employ gravity-induced sedimentation. That method is preferred in order to limit the energy required for water treatment. As a result, clarifiers are constructed with large flocculation pools and large graduated settling basins to provide a required system flow rate. Conventional clarifiers are described, for example, in U.S. Pat. No. 7,258,788 issued to Pollock on Aug. 21, 2007, entitled "Circular Clarifier Apparatus and Method," and U.S. Pat. No. 4,054,514 issued to Oltmann on Oct. 18, 1977, entitled, "Sedimentation Apparatus with Flocculating Feed Well," both of which are incorporated herein by reference.

Figure 1:
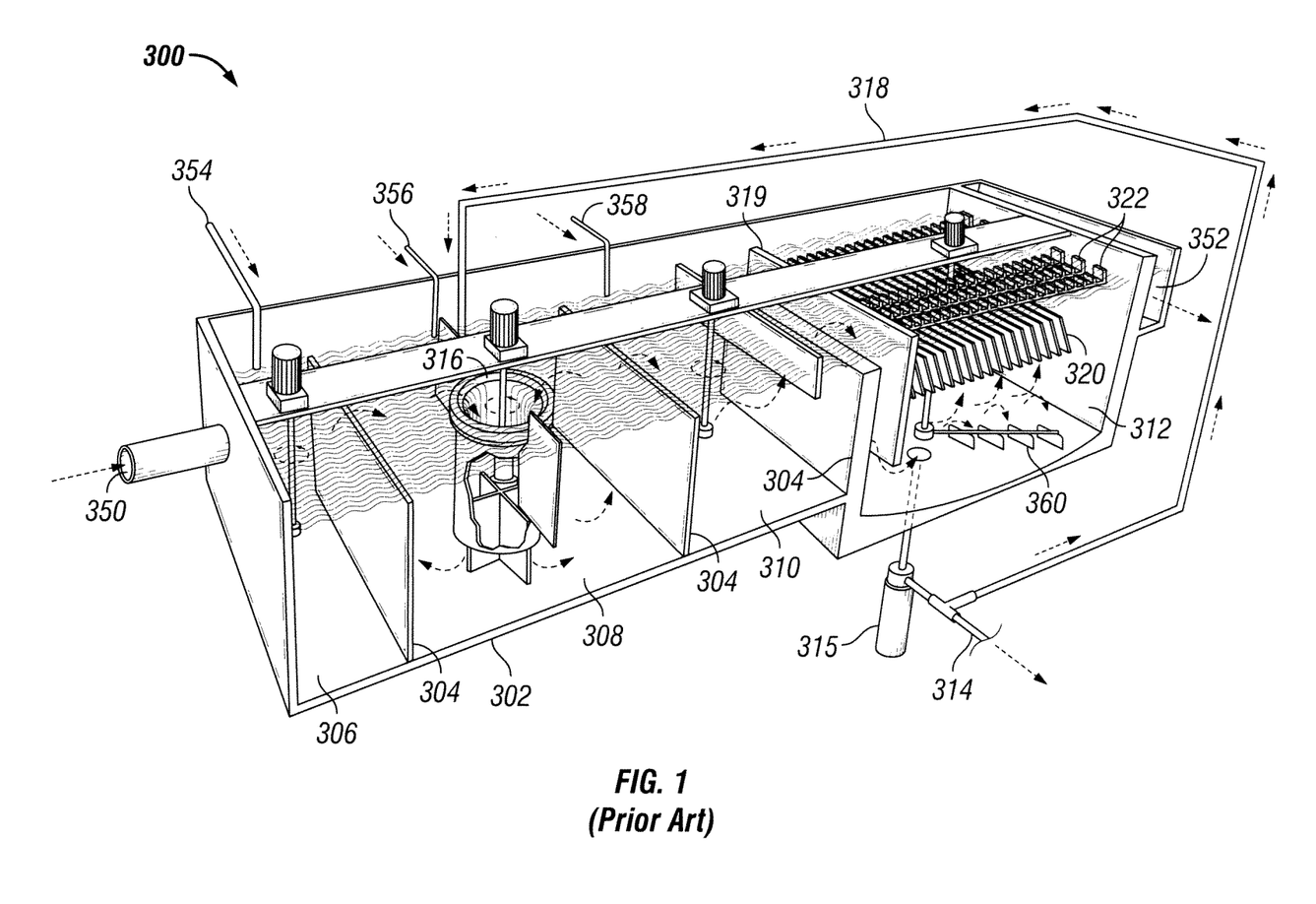
FIG. 1 is a perspective view of a conventional wastewater treatment system of prior art, showing horizontally-oriented tanks including a large settling basin.

FIG. 1 illustrates a wastewater treatment system (300) commonly employed for oilfield use. The system (300) employs a horizontal basin (302) that is open to the atmosphere. Basin (302) includes three interior vertical bulkheads (304) that divide it into four compartments—one each for rapid mixing (306), precipitation (308), flocculation (310), and settling (312). Influent wastewater (350) flows into the rapid mixing compartment (302) at one end of the basin (302). Treated water (352) flows out of the top of the settling compartment (312) at the opposite side of basin (302), with the heights of bulkheads (304) determining the water levels in all four compartments. A sludge line (314) also exits the bottom of settling compartment (312). A sludge rake or auger system (360) may be provided to aid in removing sludge from the bottom of the settling tank (312). Sludge waste may subsequently be centrifuged for thickening.

In the rapid mixing compartment (306), coagulant (354) such as lime, is added to begin the treatment process. Soda ash and caustic soda may also be added. Water then flows over the first bulkhead (304) into the precipitation compartment (308) A cylindrical mixing chamber (316) is located within the precipitation chamber (308). The mixing chamber (316) draws fluid in at the top and expels it at the bottom, creating radial up-flow in the precipitation chamber (308) outside of the mixing chamber (316). The mixing enhances crystal formation. Soda ash and/or caustic soda (356) may be added to the precipitation chamber (308). A sludge pump (315) and recirculation line (318) provides recycled sludge to enhance precipitation.

The water next flows over the second bulkhead (304) into the flocculation chamber (310). In the flocculation chamber (310), polyelectrolytes (358) are added, and gentle mixing enables floc to build. From the flocculation chamber (310), water flows over the third bulkhead (304) and is diverted to the bottom of the settling chamber (312) by a weir (319). A parallel arrangement of lamellar fins (320) provides for rapid settling of suspended solids as the water flows upward. Clarified water exits the settling chamber (312) via a series of collection troughs (322).

Maintaining the proper steady-state levels within conventional prior art systems is critical for successful operation. A disadvantage of conventional prior art systems is that should an equipment casualty result in improper levels, it may be necessary to shut down, drain, and clean the entire system to restore proper operation. Such repair is time-consuming and costly. In addition, the slow and unpleasant drain and clean process is required every time the system is relocated. It is desirable to have a self-draining, self-cleaning water treatment system that is easy to relocate.

Another disadvantage of prior art systems is their large footprint. The flow capacity of prior art systems is directly related to the area occupied by the settling tanks. Because real estate at an oil and gas well site may be severely limited, it is desirable to provide a water treatment system that both removes dissolved metals and clarifies the water that has a reduced footprint. Accordingly, the oil and gas industry requires water treatment systems with small footprints customized to its unique requirements.

Solid-contact clarifier units, also known as up-flow clarifiers, are also known in the art. Such units combine mixing, flocculation and sedimentation into a single structural unit for a reduced footprint. Mixing and flocculation occur in one compartment, and the flocculated water flows through a sludge blanket to effect floc removal by solid contact with the floating sludge blanket. Nevertheless, solid-contact clarifiers still require a relatively large sludge blanket surface area to accommodate a required system flow rate, and are therefore still not well-suited for oilfield use.

A further disadvantage of prior art clarifiers is the requirement for polymers. Synthetic polymeric coagulants, or polyelectrolytes (e.g., polyacrylates, polymaleates and their copolymers and phosphonates), are widely used in oil and gas water treatment processes for clarification. However, polyelectrolytes have low biodegradability. Additionally, although less expensive than inorganic metal coagulants such as aluminum or ferric salts, polyelectrolytes are significantly more costly than lye and soda ash. Accordingly, a polymer-free wastewater clarification process that uses only low cost and readily available coagulants and reagents is preferable.

Perhaps the most significant issue with the prior art water treatment systems is their inefficiency in treating water of the quality of now becoming prevalent in the oilfield. Municipal and industrial wastewater is typically characterized by low total dissolved solids ("TDS"), for example, between 500-1000 ppm. Accordingly, conventional prior art systems were not designed for water with high TDS. However, due to growing production of shale formations that require artificial fracturing, there is now a concomitant need to treat large volumes of frac flow-back water. Frac flow-back water often has high TDS, for example, in the range of 30,000 ppm. Typical prior art systems cannot handle the TDS content, and flow must be throttled back to about twenty percent of their nameplate capacity in order to keep the settling chamber from overloading. And, inadvertent overloading of the settling chamber requires shutdown and cleaning of the system, further exacerbating an already low throughput. Accordingly, a water treatment system suitable to handle high TDS feed without requiring even greater area for settling tanks is highly desirable.

3. Identification of Objects of the Invention

A primary object of the invention is to provide a method and apparatus for effective and efficient treatment of water having high total dissolved solids content.

Another object of the invention is to provide a method and apparatus for water treatment that uses induced gravity for separation, thereby providing a significantly reduced footprint.

Another object of the invention is to provide a method and apparatus for water treatment having a single vessel for precipitation, coagulation, and flocculation, thereby providing a reduced footprint.

Another object of the invention is to provide a method and apparatus for water treatment that clarifies water without the use of polyelectrolytes.

Another object of the invention is to provide a method and portable apparatus for water treatment that is self-draining and self-cleaning, thereby facilitating shut-down and relocation of the system.

Another object of the invention is to provide a method and portable apparatus for water treatment that is mounted to a trailer for rapid deployment and set-up.

SUMMARY OF THE INVENTION

The objects described above and other advantages and features of the invention are incorporated, in a preferred embodiment, in a method and system for the treatment of oilfield flow back water and the like. The water treatment process includes three stages—optional pretreatment, precipitation/flocculation, and separation. The water treatment system includes three major components, one for each process stage. Influent raw feed water first passes through an optional pretreatment assembly to remove oil contaminates and large suspended solids from the raw feed. Next, the pH of the water is raised and maintained at a high level by the addition of caustic or basic reagents. In a clarifier silo, gentle mixing causes dissolved solids to precipitate out of solution and to agglomerate to form suspended flocculates ("flocs"). Finally, the suspended flocculates are stripped from the feed water by centrifugal separation.

The clarifier silo is preferably but not necessarily a closed vessel with an internal mixer surrounded by a cylindrical tube diffuser. The diffuser and mixer collectively define upper, middle and lower inner chambers and an outer annular region. Each of the three inner chambers is in fluid communication with the annular region. In a first embodiment, the diffuser includes upper and lower transverse interior bulkheads that demark the inner chambers. The upper and lower bulkheads each have a central opening therethrough. A paddlewheel mixer is located in the middle chamber. In a second embodiment, the diffuser houses a mixer having upper and lower propellers that demark the inner chambers. The upper and lower propellers have opposite pitch so that each creates axial flow towards the middle chamber.

Rotation of the mixer provides gentle circulation within the clarifier silo, with axial inflow into the middle chamber from the upper and lower chambers, with radial flow from the upper and lower areas of the annular region into the upper and lower chambers, respectively, with radial outflow from the middle chamber into a middle area of the annular region, and with axial up-flow and down-flow from the middle area to the upper and lower areas, respectively, of the annular region. That is, the gentle mixing establishes separate upper and lower circulation patterns that promote crystal growth to a particular size. The circulation is sufficient to keep small crystals in suspension to promote growth but insufficient to keep larger flocs suspended. Once crystals grow to a certain size, they settle to the bottom of the clarifier for subsequent separation.

The clarifier silo may also include one or more vertical recirculation lines to recirculate some of the heavier flocculates at the bottom of the vessel into the mixer chamber. Gentle recirculation of flocs may enhance precipitation due to the seeding effect and flocculation due to increased floc collisions.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 2:
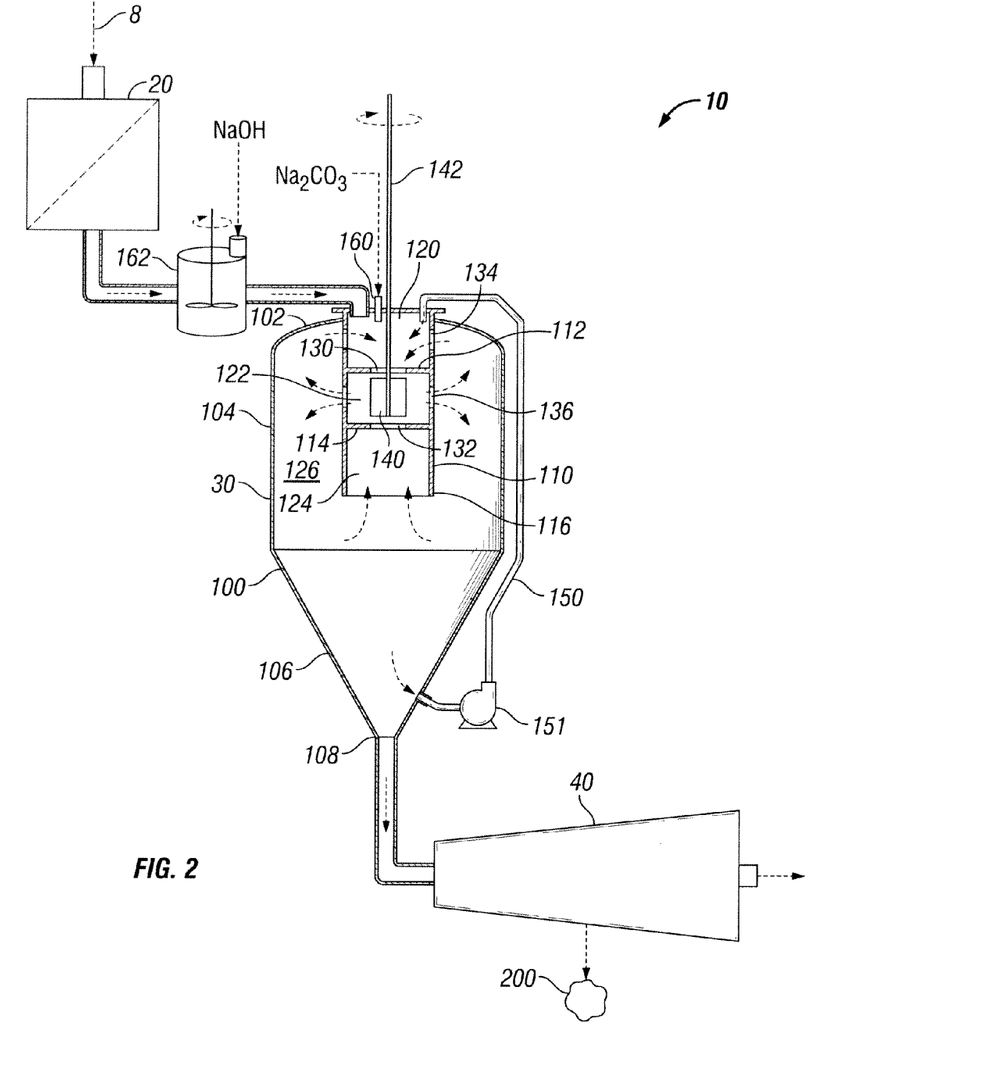
FIG. 2 is a schematic diagram of the water treatment system of according to a preferred embodiment of the invention, showing apparatus for implementing a three-stage treatment process including an optional pretreatment stage, a precipitation/flocculation stage, and a floc separation stage.

FIG. 2 is a schematic drawing of the water treatment system 10 and process according to a preferred embodiment. System 10 includes three major components—an optional pretreatment assembly 20, a clarifier or flocculator silo 30, and a centrifugal separator 40—for effecting an optional pretreatment stage, a precipitation/flocculation stage, and a floc separation stage, respectively, of the preferred process.

Influent raw feed water 8 first passes through optional pretreatment assembly 20, which may include one or more discrete technologies, for example, nutshell filters, floatation devices, aeration chambers, etc. Pretreatment assembly 20 removes oil contaminates and larger suspended solids from the raw feed. As such technologies are well known in the art of oilfield water treatment, pretreatment assembly 20 is not discussed in further detail herein.

Clarifier silo 30 preferably includes a closed vessel 100 with a top 102, an upper cylindrical portion 104, and a lower frustoconical portion 106 that tapers inwardly to a bottom 108 of a diameter near that of the outlet piping. However, other vessel shapes may be used as appropriate.

Inside vessel 100, a cylindrical tube diffuser 110 extends downwardly from top 102. Diffuser 110 ideally includes upper and lower transverse interior bulkheads 112, 114. Diffuser 110 includes three interior chambers: An upper chamber 120 located above upper bulkhead 112; a middle chamber 122 located between upper and lower bulkheads 112, 114; and a lower chamber 124 located below lower bulkhead 114. An annular region 126 is defined outside of diffuser 110.

Upper bulkhead 112 has a central inlet port 130 formed therethrough that allows axial fluid flow into middle chamber 122 from the upper chamber 120. Radial apertures 134 formed in the wall of diffuser 110 about upper chamber 120 allow fluid communication between annular region 126 and upper chamber 120. Similarly, lower bulkhead 114 includes a central inlet port 132 formed therethrough that allows axial fluid flow into middle chamber 122 from lower chamber 124. The bottom 116 of diffuser 110 is open, thereby allowing fluid communication between lower chamber 124 and annular region 126. A large number of small radial apertures 136 are formed through the wall of diffuser 110 about middle chamber 122 for allowing diffuse fluid communication between middle chamber 122 and annular region 126.

A mixer 140 is centrally located within diffuser 110. A drive shaft 142 connects mixer 140 to a drive motor located above top 102 of vessel 100. Mixer 140 may take various forms, such as a paddlewheel, turbine, propeller, impeller, or the like, and it may have curved or straight blades, a disc, a guard and/or a shroud, as is well known in the art.

Feed water exiting pretreatment assembly is preferably chemically treated prior to entering clarifier vessel 100, although it may also be chemically treated within vessel 100. The pH of the water within clarifier silo 30 is raised and maintained at a high level by the addition of one or more alkalis or other bases. For example, sodium hydroxide and/or sodium carbonate may be added in varying amounts to maintain a pH of 11 within clarifier silo 30. These reagents react with the dissolved solids, typically salts of heavy metals, to form metallic hydroxides or metallic carbonates. Because metallic hydroxides or metallic carbonates are insoluble at high pH, they precipitate out of solution. Precipitants other than sodium hydroxide and/or sodium carbonate may be used as appropriate.

A rapid mixing tank assembly 162 external to clarifier vessel 100 is preferably used for the addition of such reagents, although a port 160 in top 102 of vessel 100 (which preferably opens into diffuser 110) may be used for injecting a soda ash slurry, caustic soda, or other additive directly into clarifier 30. The chemically-treated feed water exits rapid mixer 162 and enters clarifier vessel 100 at the top 102 within diffuser 110. Although reagents are ideally premixed in rapid mixer 162, rotation of mixer 140 within diffuser also helps disperse precipitants and/or other additives uniformly throughout the clarifier vessel 100.

Within clarifier 30, the precipitate crystals aggregate to form light flocs that typically remain in suspension. Gentle mixing promotes agglomeration into larger floc particles, but overly-aggressive mixing tends to break the fragile flocs into smaller units. Mixer 140, in combination with diffuser 110, provides gentle circulation, with axial inflow into the middle chamber 122 of diffuser 110 and radial outflow into annular region 126 through apertures 136, as depicted by arrows in FIG. 2.

In particular, diffuser 110 is structured so that rotation of the mixer 140 provides gentle circulation within the clarifier silo, with axial inflow into the middle chamber from at the top and bottom of diffuser 110 and radial outflow from diffuser 110 in the middle. Such a mixer/diffuser arrangement creates separate upper and lower circulation patterns that promote floc growth to a particular size. The high-energy upper circulation pattern floods the top of mixer 140 and mixes recirculated sludge and influent feed water. The low-energy lower circulation pattern is just sufficient to recirculate small flocs in suspension to promote growth, but insufficient to keep larger flocs suspended. The length of diffuser 110 is dimensioned so that a predetermined floc size settles from suspension to the bottom 108 of vessel 100. Once flocs grow to a certain size, they settle to the bottom of the clarifier for subsequent separation.

Clarifier silo 30 may also include one or more vertical recirculation lines 150, which is preferably, but not necessarily, disposed outside of vessel 100. Recirculation line 150 has an inlet at or near the bottom 108 of vessel 100 and an outlet at the top 102 of vessel 100, preferably discharging into diffuser 110. A pressure differential across recirculation line 150 created by a recirculation pump 151 causes fluid to flow upwards in the line, thereby resulting in some of the heavier floc particles at the bottom of vessel 100 to be reintroduced into middle chamber 122. Some recirculation of flocs may enhance precipitation because of the seeding effect. Additionally, because flocculation occurs from mechanical interfacing of suspended particles, a large volume of flocculated solids recirculating within the clarifier silo 30 results in more interparticulate collisions, thus enhancing flocculation of new precipitates.

A water-floc sludge mixture exits clarifier silo 30 at the bottom 108 of vessel 100 and flows to separator 40. Separator 40 is preferably a centrifuge, which uses high-speed rotation to separate flocculates from the feed. Centrifugal force substantially greater than the force due to gravity rapidly and effectively separates the floc from the water, thereby eliminating the requirement for large and ineffective settling basins.

A common centrifuge used for dewatering sludge in a continuous process is the solid bowl type. This device includes a long bowl, normally mounted horizontally and tapered at one end. The bowl is rotated. Sludge is introduced continuously, and solids migrate to the periphery under centrifugal force. A helical scroll, rotating at a slightly different speed, transfers the accumulated sludge to the tapered end, where additional separation occurs. The concentrated sludge becomes solid waste 200, and it is diverted into a waste bin. As centrifuges are well known in the art, further detail is not provided herein. After separation, the effluent treated water may be processed further as appropriate (e.g., chemical rebalancing) and then used for flow-back, stored, or disposed.

Figure 3:
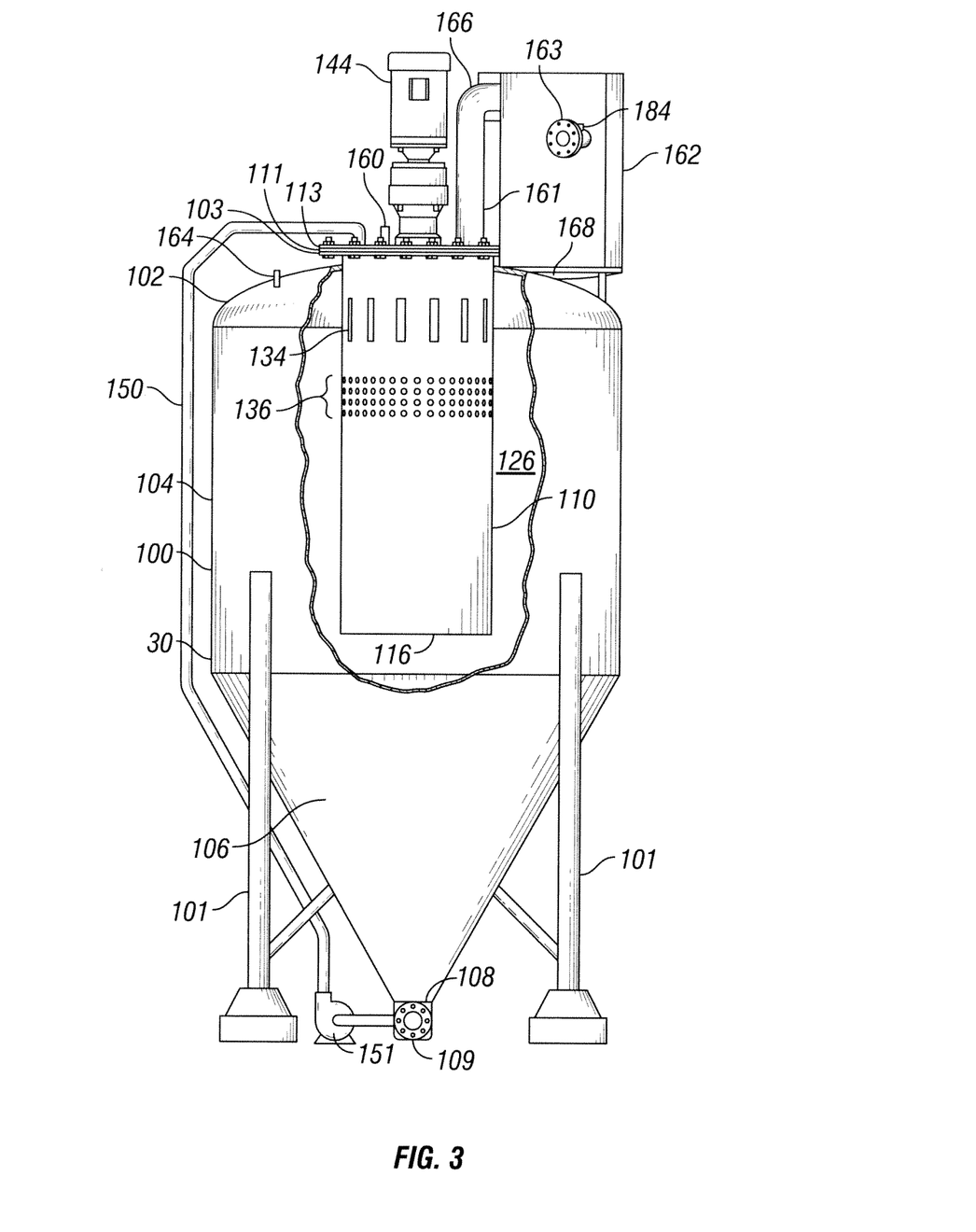
FIG. 3 is an elevation view of a clarifier silo as shown in FIG. 2 with a portion of the clarifier silo vessel cut away to reveal the internal structure, showing a diffuser with various apertures that surrounds a mixer for creating gentle dual circulation patterns within the clarifier silo.
Figure 4:
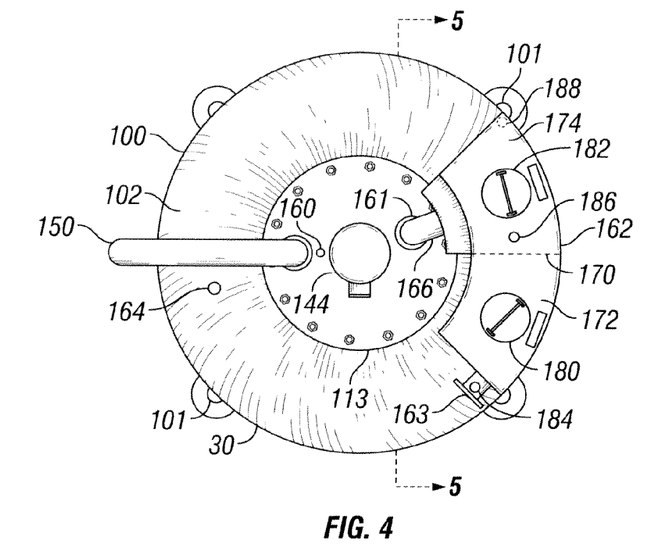
FIG. 4 is a plan view of the clarifier silo of FIG. 3, showing dual rapid mixer assembly mounted stop the clarifier silo according to a preferred embodiment.

FIGS. 3 and 4 illustrate clarifier silo 30 according to a preferred embodiment. As described above with respect to FIG. 2, clarifier silo 30 includes a vertically-oriented (i.e., having a vertical longitudinal axis) preferably closed vessel 100 with a convex top 102, an upper cylindrical portion 104, and a lower frustoconical portion 106 that tapers inwardly to a bottom 108 of diameter near that of the outlet piping. Legs 101 and associated framework suspend vessel 100 upright over the ground. Unlike typical clarifiers, which rely in part on the occurrence of sedimentation and accordingly have large horizontal dimensions with short heights, vessel 100 preferably has a height exceeding its diameter. Such is advantageous in minimizing the overall footprint of system 10 (FIG. 2).

Figure 5:
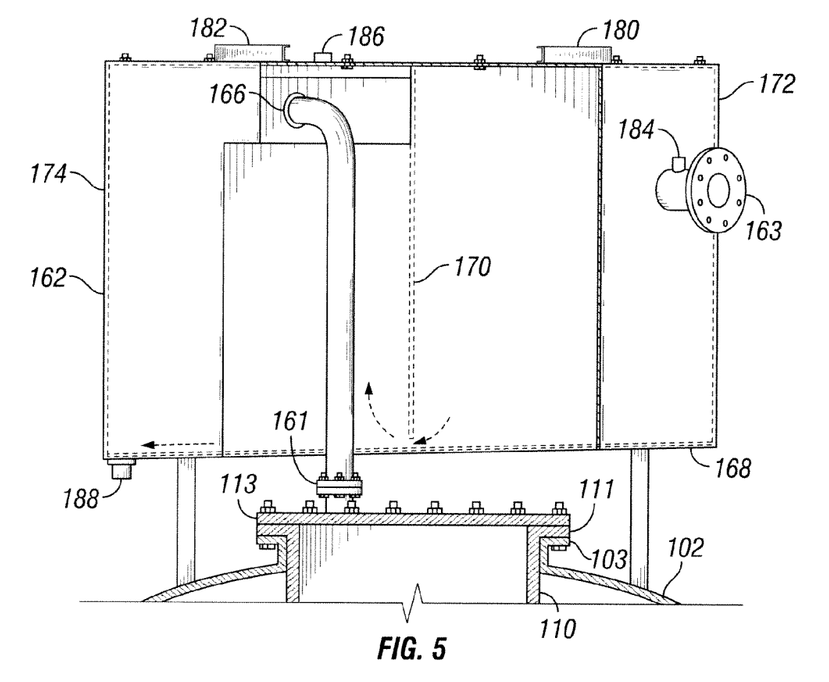
FIG. 5 is a detailed elevation view in cross section, taken along lines 5-5 of FIG. 4, of the rapid mixer assembly of FIGS. 3 and 4, showing an open-bottom interior weir dividing the assembly into two chambers and a sloped bottom for easy draining.

In FIG. 3, a portion of the wall of vessel 100 has been cut away to reveal the internal structure of clarifier silo 30. A cylindrical tube diffuser 110 extends downwardly from top 102. In the embodiment shown, diffuser 110 has an upper flange 111 that is carried by a corresponding flange seat 103 formed in top 102 of vessel 100. A flanged cover plate 113 is placed over flange 111, and the three flanges 103, 111, 113 are bolted together. (FIG. 5 shows this arrangement in greater detail.)

Upper radial apertures 134 formed in the wall of diffuser 110 allow fluid flow from annular region 126 into diffuser 110. Similarly, the bottom 116 of diffuser 110 is open, thereby allowing fluid flow from annular region 126 into diffuser 110. A large number of small radial apertures 136, formed through the wall of diffuser 110, allow diffuse fluid flow from diffuser 110 into annular region 126. A mixer 140 (not visible) is located within diffuser 110, preferably at or near the elevation of diffuse apertures 136. A drive motor 144 (shown with a speed reducer) is mounted atop cover plate 113 for rotating the mixer 140.

A feed water inlet 161 is located at the top 102 of vessel 100 so as to discharge into diffuser 110. Additionally, a port 160 in top 102 of vessel 100 opens into diffuser 110 for injecting one or more additives directly into clarifier 30. A well 164 for receiving a pH probe used for an automated chemical metering system (not illustrated) is also provided. An outlet fitting 109 is provided at the bottom 108 of vessel 100 for discharging a water-floc slurry.

Clarifier silo 30 may also include one or more vertical recirculation lines 150, which is shown disposed outside of vessel 100. Recirculation line 150 has an inlet near the bottom 108 of vessel 100 and an outlet at the top 102 of vessel 100, preferably discharging inside of diffuser 110. A recirculation pump 151 is used to provide recirculation flow within recirculation line 150.

In a preferred embodiment, a rapid mixing tank assembly 162 is mounted atop clarifier vessel 100. Mixing tank assembly 162 ideally has an arcuate shape in plan view and is dimensioned match the radius of vessel 100 yet allow clearance for cover plate 113. Mixing tank assembly 162 includes an inlet 163 and an outlet 166 that is connected to inlet 161 of clarifier silo 30.

FIG. 5 is a detailed elevation view in cross section of the rapid mixing tank assembly 162 of FIGS. 3 and 4, except that mixing tank assembly 162 is shown slightly elevated above the top 102 of clarifier silo 30 as compared to FIG. 3 so that its various features can more readily be seen. Referring to FIGS. 3-5, mixing tank assembly 162 includes an internal weir 170 that divides the tank into first and second compartments 172, 174 that are fluidly connected in tandem. Inlet 163 is located at or near the top of first compartment 172. The outlet 166 is located at or near the top of the second compartment 174. Fluid passes from the bottom of the first compartment 172 to the bottom of the second compartment 174 under weir 170. Each compartment 172, 174 includes an off-the-shelf high-speed flash chemical mixer 180, 182. As high-speed flash chemical mixer are well-known in the art, they are not discussed further herein. Inlet 163 includes a caustic soda injection port 184, and the second compartment 174 includes a soda ash slurry injection port 186.

The floor 168 of mixing tank assembly 162 is sloped from the first compartment 172 to the second compartment 174. A drain fitting 188 is located at the lowest point of the floor 168 in the second compartment 174. Because weir 170 is open at the bottom, when operation of mixing tank assembly 162 is to be ceased, the contents of both compartments 172, 174 is quickly removed simply by removing a plug in drain fitting 188. This feature promotes the portability of the water treatment system 10 (FIG. 2).

Figure 6:
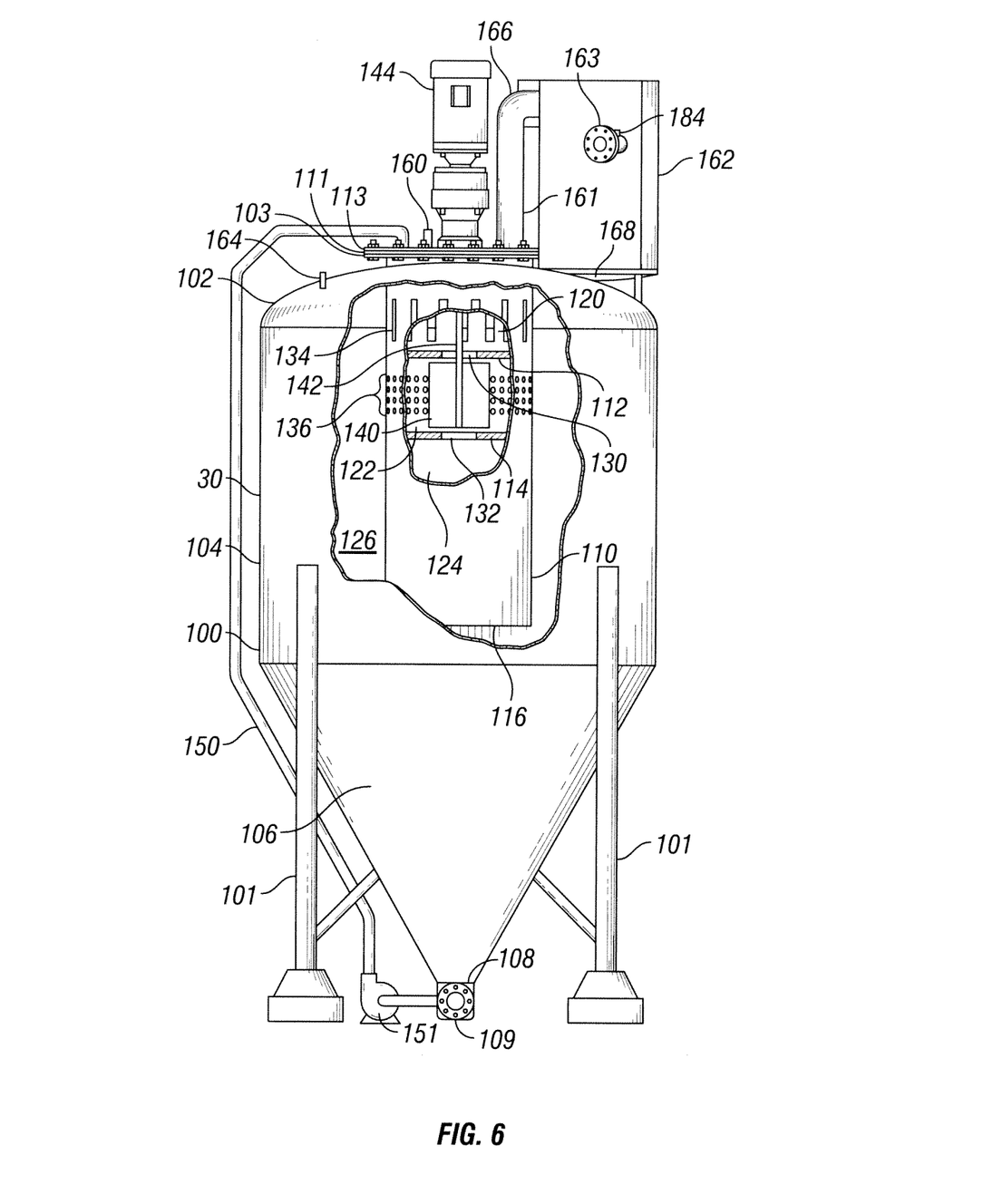
FIG. 6 is an elevation view of the clarifier silo of FIG. 3 with a portion of the diffuser cut away to reveal the mixing arrangement according to a first embodiment, showing a paddlewheel mixer disposed between upper and lower transverse bulkheads.

FIG. 6 illustrates clarifier silo 30 of FIG. 3, except that a portion of diffuser 110 is also cut away to reveal the arrangement of its various interior chambers according to a first embodiment. Diffuser 110 includes upper and lower transverse interior bulkheads 112, 114. Accordingly, diffuser 110 defines three interior chambers: An upper chamber 120 located above upper bulkhead 112; a middle chamber 122 located between upper and lower bulkheads 112, 114; and a lower chamber 124 located below lower bulkhead 114. An annular region 126 is defined outside of diffuser 110.

Upper bulkhead 112 has a central inlet port 130 formed therethrough that allows axial fluid flow into middle chamber 122 from upper chamber 120. Radial apertures 134 formed in the wall of diffuser 110 about upper chamber 120 allow fluid communication between annular region 126 and upper chamber 120. Similarly, lower bulkhead 114 includes a central inlet port 132 formed therethrough that allows axial fluid flow into middle chamber 122 from lower chamber 124. The bottom 116 of diffuser 110 is open, thereby allowing fluid communication between lower chamber 124 and annular region 126. A large number of small radial apertures 136 are formed through the wall of diffuser 110 about middle chamber 122 for allowing diffuse fluid communication from middle chamber 122 to annular region 126.

A mixer 140 is centrally located within middle chamber 122. A drive shaft 142 connects mixer 140 to a drive motor 144 located above top 102 of vessel 100. Mixer 140 may take various forms, such as a paddlewheel, turbine, propeller, impeller, or the like, and it may have curved or straight blades, a disc, a guard and/or a shroud, as is well known in the art. Mixer 140, in combination with diffuser 110, provides gentle circulation, with axial inflow into the middle chamber 122 in diffuser 110 and radial outflow into annular region 126 through apertures 136.

Figure 7:
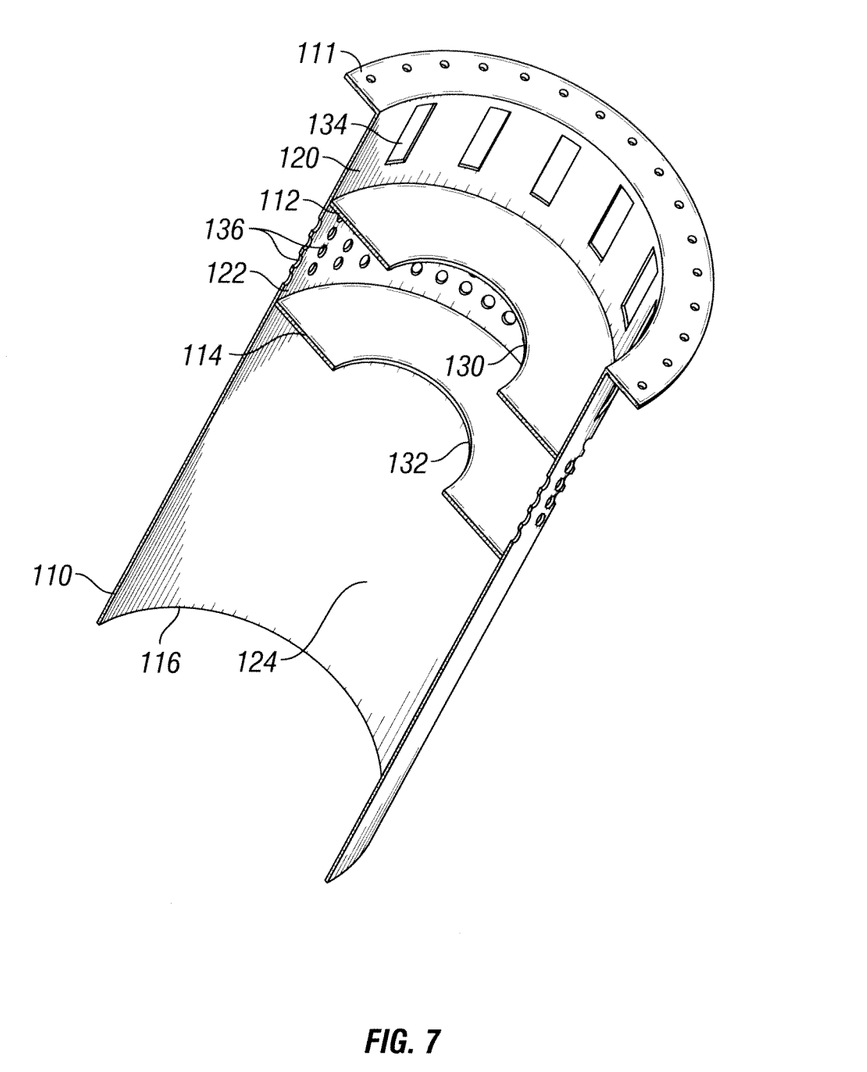
FIG. 7 is a detailed perspective view of the diffuser of FIG. 6, shown in axial cross-section.

FIG. 7 is a perspective view of the diffuser 110 of FIG. 6, shown in axial cross section. Diffuser 110 preferably has an upper flange 111 that is bolted to and carried by a corresponding flange 103 formed in top 102 of vessel 100 (FIGS. 3 and 5). Diffuser 110 includes upper and lower transverse interior bulkheads 112, 114. Accordingly, diffuser 110 defines three interior chambers: An upper chamber 120 located above upper bulkhead 112; a middle chamber 122 located between upper and lower bulkheads 112, 114; and a lower chamber located below lower bulkhead 114. Upper bulkhead 112 has a central inlet port 130 formed therethrough that allows axial fluid flow into middle chamber 122 from upper chamber 120. Large radial apertures 134 are formed in the wall of diffuser 110 about upper chamber 120. Similarly, lower bulkhead 114 includes a central inlet port 132 formed therethrough that allows axial fluid flow into middle chamber 122 from lower chamber 124. The bottom 116 of diffuser 110 is open, thereby allowing fluid communication into diffuser 110. A large number of small radial apertures 136 are formed through the wall of diffuser 110 about middle chamber 122 for allowing diffuse fluid communication out of middle chamber 122.

Figure 8:
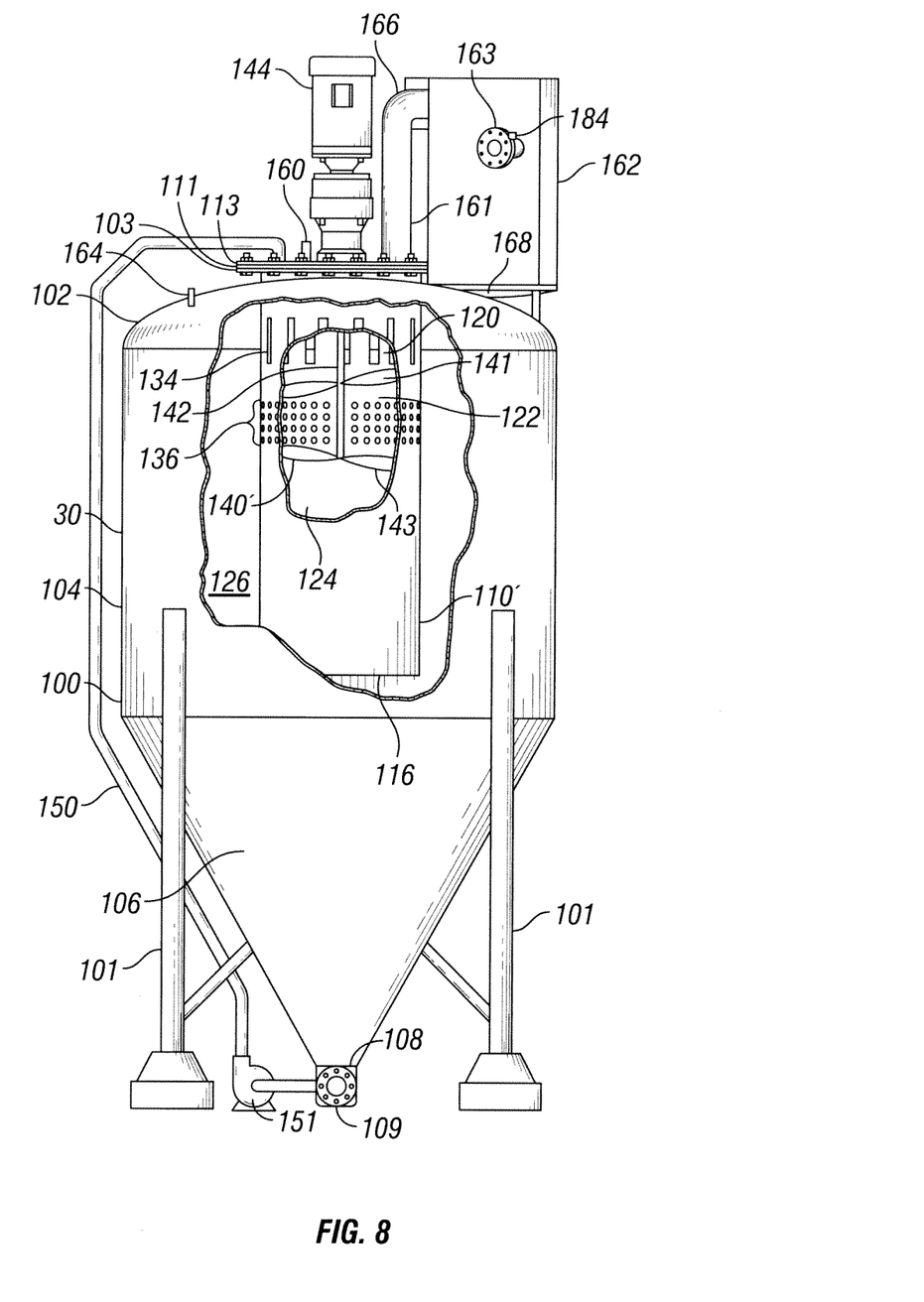
FIG. 8 is an elevation view of the clarifier silo as shown in FIG. 3 with a portion of the diffuser cut away to reveal the mixing arrangement according to a second embodiment, showing upper and lower propellers of opposite pitch.
Figure 9:
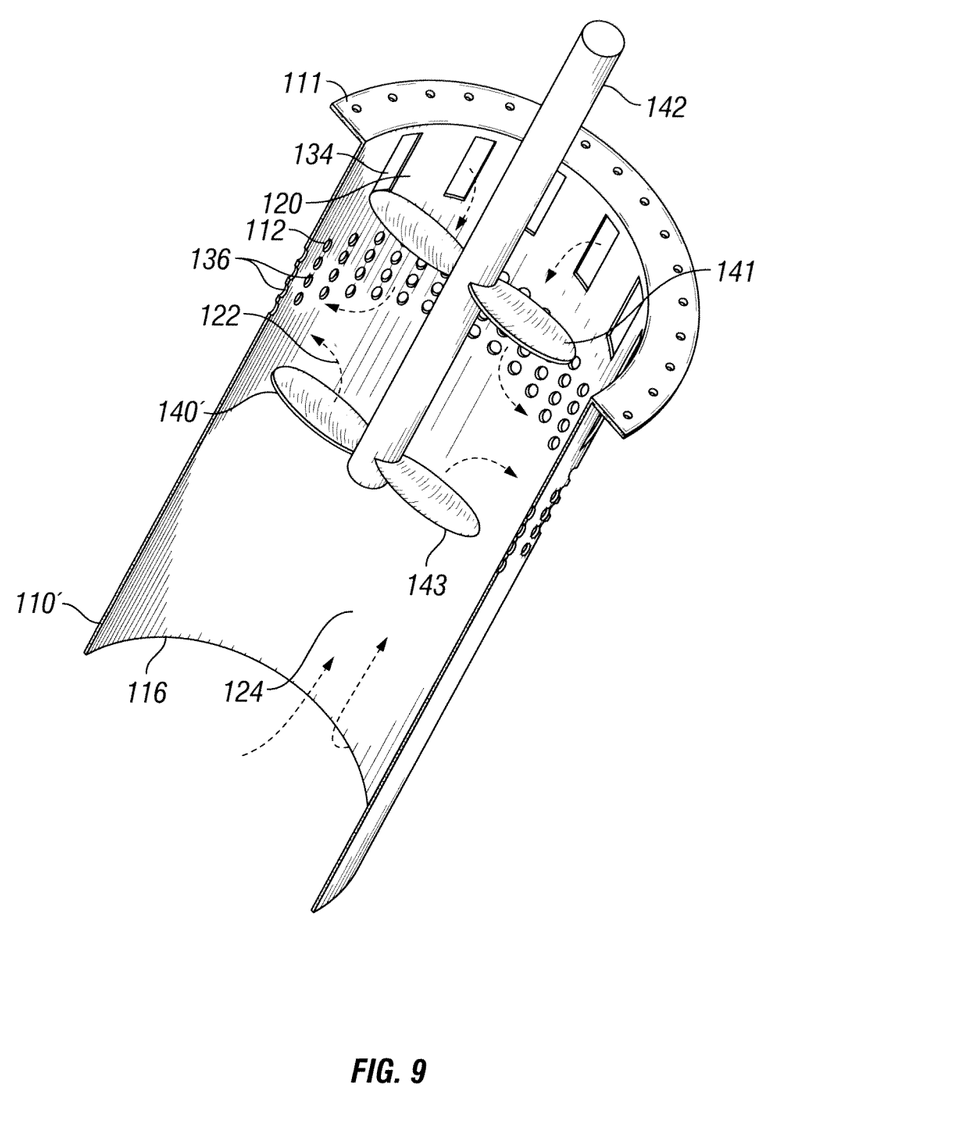
FIG. 9 is a detailed perspective view of the diffuser and mixer of FIG. 8, with the diffuser shown in axial cross-section.

FIG. 8 illustrates clarifier silo 30 of FIG. 3, except that a portion of diffuser 110' is also cut away to reveal the arrangement of its various interior chambers according to a second embodiment. FIG. 9 is a detailed perspective view of the diffuser 110' and mixer 140' of FIG. 8, shown with diffuser 110' in axial cross section. Referring to both FIGS. 8 and 9, unlike diffuser 110 of FIGS. 6 and 7, diffuser 110' does not includes transverse interior bulkheads. Rather the three interior chambers of diffuser 110'—upper chamber 120, middle chamber 122, and lower chamber 124—are demarked by mixer 140'. Mixer 140' includes an upper propeller 141 and a lower propeller 143. Upper chamber 120 is located above upper propeller 141. Middle chamber 122 is located below upper propeller 141 and above lower propeller 143. Lower chamber 124 is located within diffuser 110' below lower propeller 143.

Upper propeller 141 is pitched so that when rotated, fluid axially flows from upper chamber 120 into middle chamber 122. Radial apertures 134 formed in the wall of diffuser 110 about upper chamber 120 allow fluid communication between annular region 126 and upper chamber 120. Similarly, lower propeller 143 is pitched so that when rotated, fluid axially flows from lower chamber 124 into middle chamber 122. The bottom 116 of diffuser 110 is open, thereby allowing fluid communication between lower chamber 124 and annular region 126. A large number of small radial apertures 136 are formed through the wall of diffuser 110 about middle chamber 122 for allowing diffuse fluid communication from middle chamber 122 to annular region 126.

Preferably, the upper and lower propellers 141, 143 have opposite pitch so that each may be rotated on a common shaft 142 to create axial flow towards the middle chamber. However, other arrangements, such as individual coaxial shafts, may be used. When rotated, propellers 141, 143 create low pressure upper and lower chambers 120, 124 and high pressure in middle chamber 122, thereby creating the desired dual circulation pattern. The pitch and size of each propeller 141, 143 is designed in conjunction with diffuser 110' to created the desired energy levels for the upper and lower circulation patterns thereby determining the size at which floc settles.

Figure 10:
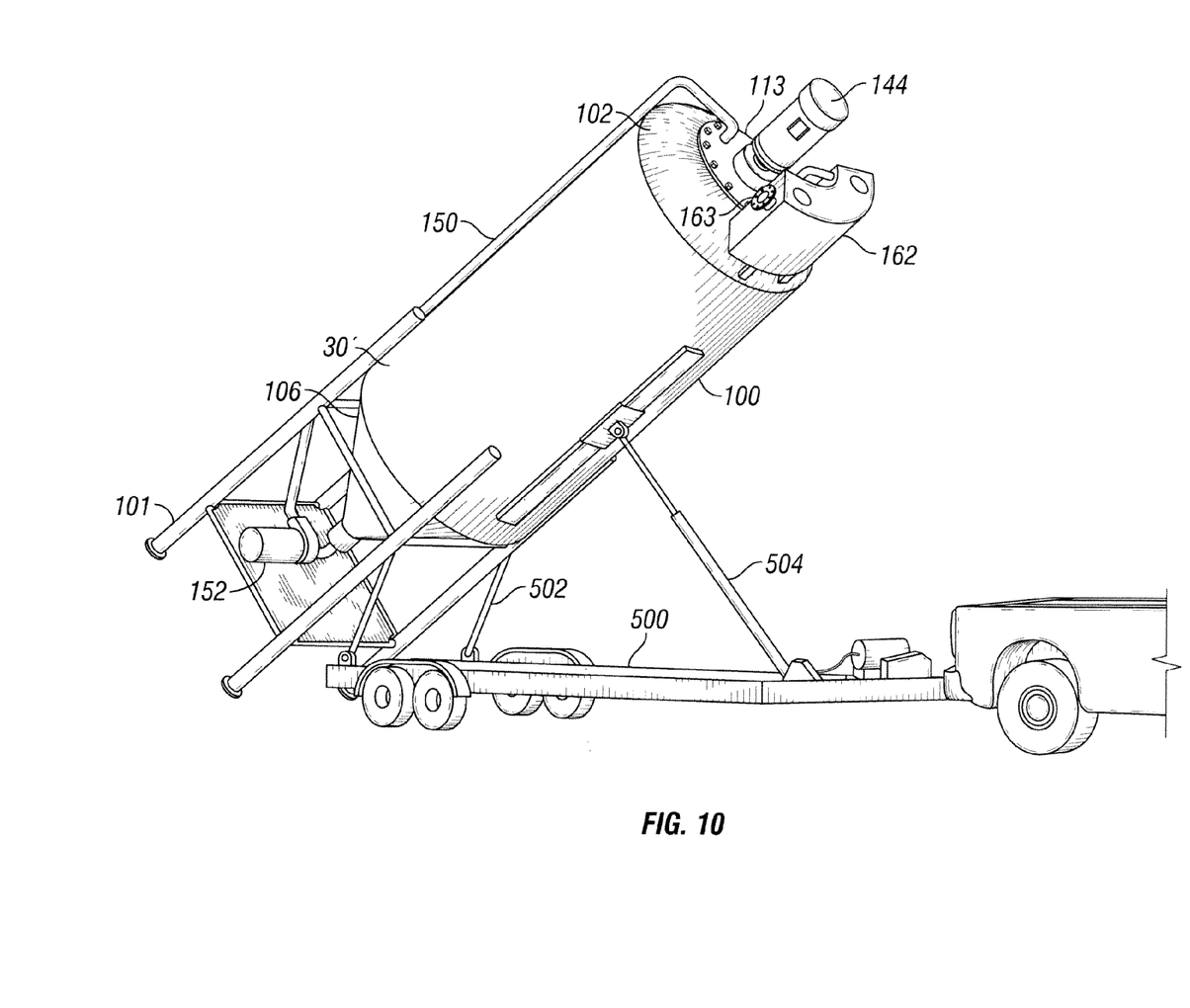
FIG. 10 is a perspective view of the clarifier silo of FIG. 3 pivotally mounted on a trailer for rapid deployment according to a further embodiment.

FIG. 10 illustrates a water clarifier silo 30' according to a further embodiment. Clarifier silo 30' is substantially identical in all respects to clarifier silo 30 of FIGS. 3 and 4, except that it is frame 101 is pivotally mounted to the rear of a trailer 500. One or more pivoting arms and hydraulic actuators 504 are used to rapidly and easily transfer clarifier 30' from a horizontal stowed configuration to a vertical operational configuration. Once in a vertical operating position, arms 502 and actuator 504 may be disconnected from clarifier silo 30' so that trailer 500 may be moved from the site.

The water treatment system 10 according to the invention obviates the need for large settling tanks to precipitate, coagulate, flocculate, and then separate suspended floc. Instead, a small vertical silo 30 gently mixes caustic and/or basic chemicals to precipitate, coagulate, and flocculate, and centrifugal separator 40 uses "induced gravity" to separate for a reduced footprint. The water treatment system provides for an effective, continuous water treatment process without the need for added polymers, or polyelectrolytes, for promoting coagulation. Although water treatment 10 has been described for use particularly in oilfield applications, it may equally be used in any water treatment application. For example, acid mine drainage from coal mines and tailing ponds from tar sands may particularly benefit from high TDS capability of system 10.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A water treatment system (10) comprising:
 a clarifier (30), said clarifier (30) including,
  a vertically-oriented vessel (100),
  a tubular diffuser (110) vertically disposed within said vessel (100), said diffuser (110) defining an annular chamber (126) between an exterior wall of said diffuser (110) and an interior wall of said vessel (100), said diffuser (110) extends downwardly from a top (102) of said vessel (100) and includes an open bottom (116), said diffuser (110) includes a first plurality of ports (134) radially disposed about the circumference of said diffuser near said top (102) and includes a second plurality of ports (136) radially disposed about the circumference of said diffuser below said first plurality of ports (134), said diffuser (100) includes interior upper, middle, and lower chambers (120, 122, 124) and defines an exterior annular region (126), said annular region (126) includes upper, middle and lower areas corresponding generally in elevation to said upper, middle, and lower chambers (120, 122, 124), respectively; and a mixer (140) disposed within said diffuser (110), wherein said mixer (140) and said diffuser cooperate to create upper and lower circulation patterns in said vessel (100), said upper circulation pattern includes axial down-flow from said upper chamber (120) into said middle chamber (122), radial out-flow from said middle chamber (122) to said middle area of said annular region (126), axial up-flow from said middle area of said annular region (126) to said upper area of said annular region (126), and radial inflow from said upper area of said annular region (126) to said upper chamber (120), and said lower circulation pattern includes axial up-flow from said lower chamber (124) into said middle chamber (122), radial out-flow from said middle chamber (122) to said middle area of said annular region (126), axial down-flow from said middle area of said annular region (126) to said lower area of said annular region (126), and radial inflow from said lower area of said annular region (126) to said lower chamber (124).

2. The water treatment system (10) of claim 1 wherein:
said vessel (100) has a lower portion (106) that tapers inward downwardly.

3. The water treatment system (10) of claim 1 wherein:
said diffuser (110) includes an upper interior transverse bulkhead (112) disposed between said first plurality of ports (134) and said second plurality of ports (136), said upper interior transverse bulkhead including a first opening (130) therethrough;
said diffuser (110) includes a lower interior transverse bulkhead (114) disposed below said second plurality of ports (136), said lower interior transverse bulkhead including a second opening (132) therethrough; and
said mixer (140) is disposed between said first plurality of ports (134) and said second plurality of ports (136).

4. The water treatment system (10) of claim 1 wherein:
said mixer (140) includes an upper mixing element (141) disposed between said first plurality of ports (134) and said second plurality of ports (136), said upper mixing element (141) being operative to move fluid axially downward within said diffuser (110); and
said mixer (140) includes a lower mixing element (143) disposed below said second plurality of ports (136), said lower mixing element (143) being operative to move fluid axially upward within said diffuser (110).

5. The water treatment system (10) of claim 1 wherein:
said clarifier (30) includes a recirculation line (150) fluidly coupled between a first point near the bottom (108) of said vessel to a second point in said diffuser (110) above said mixer (140).

6. The water treatment system (10) of claim 1 further comprising:

a source of a reagent operative to precipitate dissolved solids and coagulate precipitate; and
a centrifuge (40) fluidly coupled to an outlet (109) of said clarifier (30).

7. The water treatment system (10) of claim 6 wherein:
said source of a reagent includes only one or more reagents from the group consisting of caustic soda and soda ash.

8. The water treatment system (10) of claim 1 wherein:
said system excludes a source of polyelectrolytes.

9. The water treatment system (10) of claim 1 wherein:
said system excludes a tank arranged for gravity-induced separation.

10. The water treatment system (10) of claim 1 further comprising:
a trailer (500), said vessel (100) mounted to said trailer (500) so as to be pivotable between a horizontal orientation and a vertical orientation.

11. The water treatment system (10) of claim 1 further comprising:
a rapid mixing tank assembly (162) having an outlet (166) fluidly coupled to an inlet (161) of said clarifier (30).

12. The water treatment system (10) of claim 11 wherein:
said rapid mixing tank assembly (162) is mounted atop said vessel.

13. A water treatment system (10) comprising:
a clarifier (30), said clarifier (30) including,
a vertically-oriented vessel (100),
a tubular diffuser (110) vertically disposed within said vessel (100), said diffuser (110) defining an annular chamber (126) between an exterior wall of said diffuser (110) and an interior wall of said vessel (100), and
a mixer (140) disposed within said diffuser (110),
wherein said mixer (140) and said diffuser cooperate to create upper and lower circulation patterns in said vessel (100); and
a rapid mixing tank assembly (162) having an outlet (166) fluidly coupled to an inlet (161) of said clarifier (30), said rapid mixing tank assembly (162) includes a weir (170) that divides said rapid mixing tank assembly (162) into first and second compartments (172, 174), said weir (170) having an open bottom so that fluid may flow from said first compartment (172) to said second compartment (174);
said rapid mixing tank assembly (162) has a sloped floor (168) so that fluid flows from said first compartment (172) to said second compartment (174) under the influence of gravity, and said rapid mixing tank assembly (162) includes a drain fitting (188) disposed in said floor (168) at the lowest elevation whereby said rapid mixing tank assembly (162) may self-empty under the influence of gravity via said drain fitting (188).

14. The water treatment system (10) of claim 1 wherein:
said vessel (100) has a closed top (102).

15. The water treatment system (10) of claim 13 wherein:
said rapid mixing tank assembly (162) includes first and second chemical mixers (180, 182) disposed in said first and second compartments (172, 174), respectively.

16. The water treatment system (10) of claim 13 wherein:
said rapid mixing tank assembly (162) is mounted atop said vessel.

17. A water treatment system (10) comprising:
a clarifier (30), said clarifier (30) including,
a vertically-oriented vessel (100),
a tubular diffuser (110) vertically disposed within said vessel (100), said diffuser (110) defining an annular chamber (126) between an exterior wall of said diffuser (110) and an interior wall of said vessel (100), and a mixer (140) disposed within said diffuser (110), wherein said mixer (140) and said diffuser cooperate to create upper and lower circulation patterns in said vessel (100); and a rapid mixing tank assembly (162) having an outlet (166) fluidly coupled to an inlet (161) of said clarifier (30), said rapid mixing tank assembly (162) includes first and second chemical mixers (180, 182) disposed in first and second compartments (172, 174), respectively.

18. The water treatment system (10) of claim 16 wherein:

said rapid mixing tank assembly (162) is mounted atop said vessel.

\* \* \* \* \*